April 17, 1934.  R. M. HEINTZ  1,955,127
CLAMP BASE
Filed Dec. 9, 1932
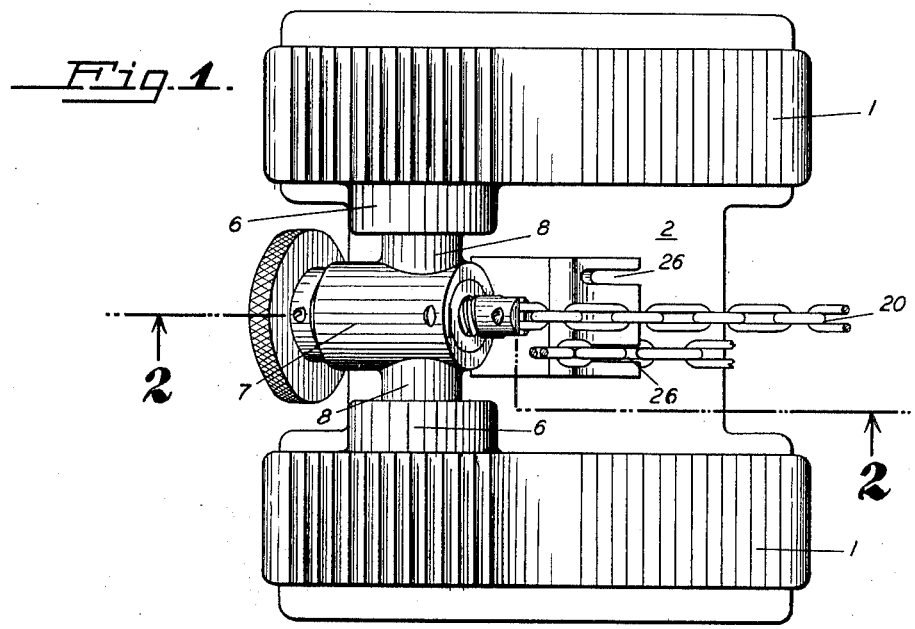
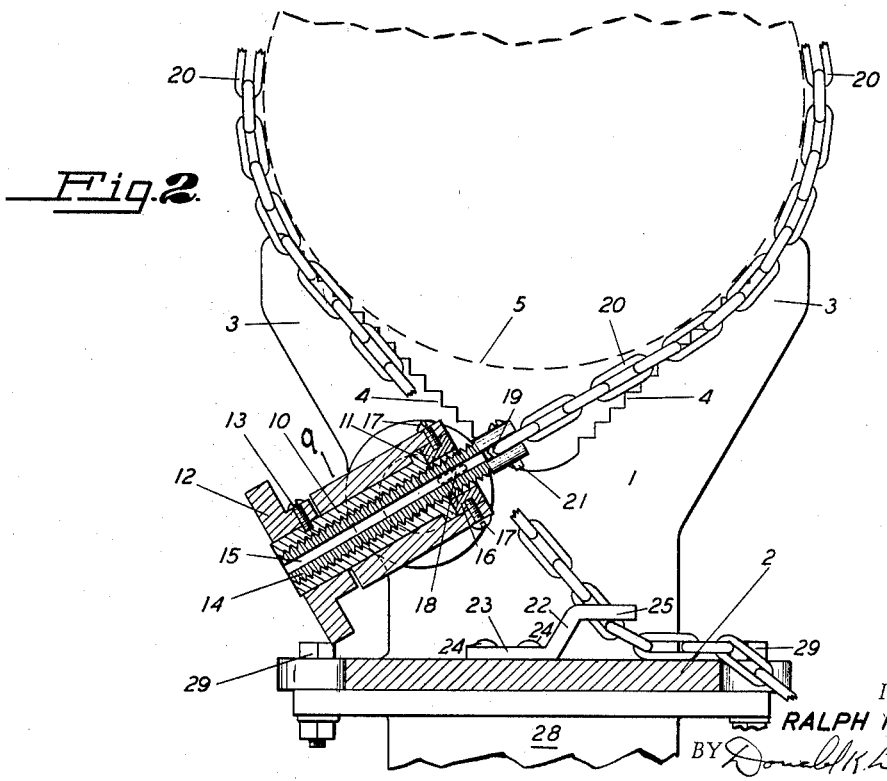
INVENTOR,
RALPH M. HEINTZ.
BY Donald K. Lippincott
ATTORNEY Patented Apr. 17, 1934

1,955,127

UNITED STATES PATENT OFFICE 1,955,127

CLAMP BASE

Ralph M. Heintz, Palo Alto, Calif., assignor to Heintz & Kaufman, Ltd., San Francisco, Calif., a corporation of Nevada Application December 9, 1932, Serial No. 646,409

2 Claims. (Cl. 248—30)

My invention relates to a clamp base and more particularly to a base which may be clamped to variously sized poles, trees, or the like to provide a firm foundation for a machine, such as for example, a hand-driven electric generator.

Among the objects of my invention are: To provide a clamp base that may be quickly attached to various firm objects; to provide a base for a machine that may be clamped to firm objects of various sizes; and to provide a steady base for a hand-driven generator or the like, which may be quickly attached to or detached from various firm objects encountered in the field.

Other objects of my invention will be apparent or will be specifically pointed out in the description forming a part of this specification, but I do not limit myself to the embodiment of my invention herein described, as various forms may be adopted within the scope of the claims.

Referring to the drawing:

Figure 1 is a plan view looking toward the inside of a preferred form of clamp.

Figure 2 is a sectional view taken along a section indicated by the line 2—2 in Figure 1.

A pair of angular jaw plates 1 are firmly attached to or formed integral with a base plate 2. I prefer to make the jaws 3 of each plate with indented or rough edges 4, and maintain these edges substantially at right angles with the apex of the angle toward the base plate. I also prefer to mount the jaw plates substantially at the opposite outer edges of the base plate to provide a proper bearing on various sizes of stationary objects to which the base may be applied, such as trees, poles, vehicles or the like, which may be available. Such an object is represented in Figure 2 by the dotted line 5. It is apparent that the size of these objects is unimportant between all limits which may be encompassed by the size of the jaws, and that substantial irregularities of contour may be accommodated.

Each of the jaw plates is provided with an inwardly projecting bearing boss 6 laterally mounted under one of the jaws. These bearing bosses support a chain tightener assembly 7 by receiving trunnions 8, which are attached to a barrel 9, thus allowing free rotation of the barrel around the axis of the bosses 6. The barrel is bored out to receive a hollow screw block 10 held in by a flange 11 and maintained in position by a hand wheel 12 secured to the screw block by a set screw 13. The interior of the screw block is threaded to receive a screw 14 provided with spline grooves 15, and is kept from rotating by a spline block 16 secured to the barrel by lock screws 17. This spline block has spline studs 18 cooperating and fitting the spline grooves.

Rotation of the hand wheel will cause the screw 14 to progress in or out of the chain tightener assembly, without rotation of the screw 14.

The inner end of the screw is split to form a chain connector receptacle 19 which receives a link of a chain 20. A chain lock screw 21 maintains the link in the receptacle against pressure.

I prefer to mount the chain tightener assembly so that the hand wheel extends toward the outside of the device, and, after the chain has been attached to the chain connector assembly to pass the chain across the interior of the base, around the object to which the base is to be applied and back to the base, again crossing over to the side of the base plate opposite the insertion of the chain tightener assembly.

On this opposite side I provide a quick detachable connector in the form of a plate 22 having a portion 23 secured to the base plate by rivets 24 and a raised portion 25 in which are cut two link receptacles 26, one on each side of the axis projected from the chain connector screw.

These link receptacles are cut just wide enough to receive a link in its narrowest dimension but not wide enough to allow the following link to pass.

The receptacles are set to one side of the axis of the tightener so that in crossing, as above described, the chain will pass to one side of the tightener assembly and will not interfere with its operation.

The outside face of the base plate is adapted to form the foundation for a machine, and holes bored in the base plate provide means for attaching such a machine, as indicated by the numeral 28, by the use of bolts 29.

In use the jaws 3 are applied to any firm stationary object, the chain is attached at the chain connector receptacle 19, passed around the object, crossed to one side of the tightener, pulled up as tight as possible by hand, and the nearest link dropped into one or the other link receptacles. The hand wheel is then rotated to take up the slack in the chain until it becomes tight. The entire clamp is thus firmly secured to the stationary object.

In as much as the entire tightener assembly is rotatable on its trunnions, the pull will always be tangent to the circumference of the stationary object, the tangent being coextensive with the line of the screw axis. This assures that there will always be a straight pull on the chain. As the chain may be longer than necessary for large objects, it is obvious that the size of the stationary object is unimportant within wide limits.

After the clamp has been attached, it is then utilized as a base for a machine, more particularly for a light hand-driven electric generator such as is used in exploratory expeditions to supply current for radio transmission or reception.

I claim:

1. A clamp base comprising a pair of angular brackets adapted to engage support members of various sizes, a base plate connecting said brackets, having an inside face and an outside face, means for attaching a machine to said outside face, a chain adapted to pass around a support member, a slotted connector plate mounted on said inside face for receiving and locking a link of said chain after said chain has passed around said support member, and means movable by the tension of said chain to be constantly in line with the tangent of said support member mounted on said inside face to tighten said chain, said chain in position crossing within the space between said brackets.

2. In combination with a base having an inside and outside face, a pair of spaced angular brackets adapted to engage support members of various sizes attached to said inside face, means for attaching a machine to said outside face, a chain adapted to pass around a support member, a connector plate mounted on said inside face between said brackets, said plate having a slot for receiving and locking a link of said chain after said chain has passed around said support member, and means fastened on said inside surface between said brackets for applying tension to said chain along a line tangential to the circumference of said support member, said chain crossing within the space between said brackets, the insertions of said chain in said plate and said tensioning means being offset to prevent said chain touching at the point of crossing.

RALPH M. HEINTZ.